United States Patent
Cox

(10) Patent No.: US 10,337,583 B2
(45) Date of Patent: *Jul. 2, 2019

(54) THROUGH-SHAFT STEERING DAMPER

(71) Applicant: MF IP Holding, LLC, West Jordan, UT (US)

(72) Inventor: Christopher Paul Cox, West Jordan, UT (US)

(73) Assignee: MF IP Holding, LLC, West Jordan, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/887,930

(22) Filed: Feb. 2, 2018

(65) Prior Publication Data

US 2018/0156295 A1  Jun. 7, 2018

Related U.S. Application Data

(63) Continuation of application No. 15/338,099, filed on Oct. 28, 2016, now Pat. No. 9,890,828.

(51) Int. Cl.
*F16F 9/20* (2006.01)
*B62D 7/22* (2006.01)
(Continued)

(52) U.S. Cl.
CPC .................. *F16F 9/20* (2013.01); *B62D 7/22* (2013.01); *F16F 9/3221* (2013.01);
(Continued)

(58) Field of Classification Search
CPC ...... F16F 9/20; F16F 9/088; F16F 9/36; F16F 9/0472; F16F 9/067; F16F 9/365; F16F 9/00; F16F 9/04; B62D 7/22; B60G 15/12
(Continued)

(56) References Cited

U.S. PATENT DOCUMENTS 3,131,921 A  5/1964  Karbowniczek
3,368,697 A  2/1968  Carlson
(Continued)

FOREIGN PATENT DOCUMENTS

DE  42 31 016 A1  3/1994
EP  1 054 185 A2  11/2000
(Continued)

OTHER PUBLICATIONS

G3-S Shock Types, Race Tech, n.d., <http://www.racetech.com/page/title/G3S%20Shock%20Types> [retrieved Sep. 13, 2016], 5 pages.
(Continued)

*Primary Examiner* — Thomas W Irvin
(74) *Attorney, Agent, or Firm* — Christensen O'Connor Johnson Kindness PLLC

(57) ABSTRACT

Generally described, aspects of the disclosed subject matter are directed to through-shaft dampers. In accordance with aspects of the present disclosure, the through-shaft dampers generally include a shaft having a piston traveling within a body, a first chamber for a damping fluid, and a second chamber for a gas. The chambers are separated by a movable wall associated with an insert and configured to provide a volumetric change of the second chamber that is inverse to a volumetric change of the damping fluid. The insert is configured such that the sealing surfaces of the movable wall do not interface the shaft during use of the damper. In this regard, a significant reduction in the total displacement traveled by the seals is realized.

18 Claims, 9 Drawing Sheets

(51) Int. Cl.
*F16F 9/36* (2006.01)
*F16F 9/32* (2006.01)
*B60G 15/12* (2006.01)
*F16F 9/04* (2006.01)
*F16F 9/088* (2006.01)
*F16F 9/06* (2006.01)

(52) U.S. Cl.
CPC ............ *F16F 9/3242* (2013.01); *F16F 9/365* (2013.01); *B60G 15/12* (2013.01); *F16F 9/0472* (2013.01); *F16F 9/067* (2013.01); *F16F 9/088* (2013.01); *F16F 9/36* (2013.01)

(58) Field of Classification Search
USPC .......................................... 188/312, 298, 317
See application file for complete search history.

(56) References Cited

U.S. PATENT DOCUMENTS

| | | | |
|---|---|---|---|
| 4,191,280 A | 3/1980 | Copperwheat | |
| 4,392,638 A | 7/1983 | Kato et al. | |
| 4,981,199 A * | 1/1991 | Tsai | A63B 21/0083 188/276 |
| 5,042,625 A | 8/1991 | Maus | |
| 5,829,556 A | 11/1998 | Domange | |
| 6,131,709 A * | 10/2000 | Jolly | F16F 9/20 137/909 |
| 6,135,434 A | 10/2000 | Marking | |
| 6,216,831 B1 * | 4/2001 | Taylor | F16F 9/20 188/280 |
| 6,615,959 B2 | 9/2003 | Eroshenko | |
| 7,226,045 B2 | 6/2007 | Brookes | |
| 7,264,095 B2 | 9/2007 | Domange | |
| 7,314,124 B2 | 1/2008 | Martyn et al. | |
| 7,575,110 B2 | 8/2009 | Yoshimoto | |
| 8,196,722 B2 | 6/2012 | Satou et al. | |
| 8,424,657 B2 | 4/2013 | Hsu | |
| 8,682,539 B2 * | 3/2014 | Jones | B62D 33/0608 188/267.1 |
| 8,800,729 B2 | 8/2014 | Yabe et al. | |
| 8,960,385 B2 | 2/2015 | Achenbach | |
| 9,022,188 B2 | 5/2015 | Lee et al. | |
| 9,206,874 B2 | 12/2015 | Sugata | |
| 9,290,231 B1 | 3/2016 | Jurrens | |
| 2004/0130079 A1 | 7/2004 | Gold et al. | |
| 2006/0096820 A1 | 5/2006 | Beck | |
| 2009/0008196 A1 | 1/2009 | Suzuki et al. | |
| 2014/0291087 A1 * | 10/2014 | Bianchi | F16F 9/065 188/297 |
| 2016/0017953 A1 | 1/2016 | Lee | |
| 2016/0031284 A1 | 2/2016 | Yamashita et al. | |

FOREIGN PATENT DOCUMENTS

| | | | | |
|---|---|---|---|---|
| EP | 1630449 A1 * | 3/2006 | ......... | B60G 21/0551 |
| EP | 1 508 722 B1 | 6/2006 | | |
| EP | 2110300 A2 * | 10/2009 | ............. | B26K 25/08 |

OTHER PUBLICATIONS

"Technology," Valde Racing-Suspension & Braking System Specialist, n.d., <http://www.valderacing.com/home/portfolio/technology/> [retrieved Sep. 13, 2016], 5 pages.

* cited by examiner

Fig. A.

THROUGH-SHAFT STEERING DAMPER

CROSS REFERENCE TO RELATED APPLICATIONS

This application is a continuation of U.S. patent application Ser. No. 15/338,099, filed Oct. 28, 2016, to be issued as U.S. Pat. No. 9,890,828 on Feb. 13, 2018, the disclosure of which is hereby expressly incorporated by reference herein in its entirety.

BACKGROUND

A damper provides a damping force in reaction to motion. In one particular installation, a damper within a steering system provides a damping force to the steering components of a vehicle. A steering damper is typically used to reduce or eliminate uncontrolled steering movements, steering system input caused by the roadway or impact of objects with the tires, underdamped oscillation of the steering system, and/or other undesired effects on the control or steering feel of a vehicle. The addition of a steering damper to a vehicle can also alleviate driver fatigue by reducing the effort required to maintain the steering wheel at the desired steering input.

The damper is generally mounted to span a moving component of the steering system and another vehicle component, often a stationary component, such as the frame of the vehicle. In this regard, a steering damper is typically a through-shaft type damper, having a shaft extending the length of the damper body, with a mounting point at one end of the shaft, and a second mounting fixture integrated with or attached to the body of the damper. Through-shaft steering dampers provide advantages in this context by exhibiting balanced damping characteristics in both damping directions, and often provide increased shaft range over conventional dampers.

Through-shaft dampers require an additional sealing point over a non-through-shaft damper as a result of the shaft extending through both ends of the damper body. In damper configurations using a secondary gas (e.g. nitrogen gas) chamber in addition to the damping fluid chamber, an intermediate floating piston or dividing bladder is often used to separate the gas and damping fluid. In these types of dampers, the gas provides a positive pressure that reduces the tendency for cavitation of the hydraulic damping fluid, can be compressed to allow for thermal expansion, and provides a means for adjustment of the characteristics of the damper by changing the pressure of the gas. In conventional through-shaft dampers, the intermediate floating piston or dividing bladder is generally located in the damper body or in a remote reservoir. In the through-shaft configurations without a remote reservoir, the sealing surfaces of the interface where the shaft passes through the damper body must create a seal on the shaft between the gas and the atmosphere. Due to the difficulty of sealing gas from the atmosphere, and the relatively high velocity and displacement of the shaft with respect to the seal, the particular seal location is prone to premature failure, allowing the gas to escape, or allowing contaminants to ingress the secondary chamber. Conversely, a remote reservoir setup removes the need for such a seal, but requires additional packaging space and is typically more expensive to manufacture.

Therefore, a need exists for an improved through-shaft steering damper, without resorting to an external reservoir, that eliminates the need to seal the gas chamber from the atmosphere along the shaft of the damper. Embodiments of the present disclosure are directed to fulfilling these and other needs.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a through-shaft damper is provided. The through-shaft damper generally includes an elongate damper body comprising a central bore having an inner surface and defining a first chamber configured to retain damping fluid, the elongate damper body having a first aperture at a proximal end and a second aperture at a distal end; a shaft slidingly disposed within the central bore and extending through the first aperture and the second aperture; a first piston fixed to the shaft within the first chamber, and configured to sealingly engage the inner surface of the central bore; an insert coupled to the distal end of the elongate damper body, the insert surrounding the shaft and extending from the distal end into the first chamber; a second chamber within the bore configured to retain a gas, the second chamber partially defined by an external surface of the insert; and a movable wall associated with the insert and providing fluid separation between the first chamber and the second chamber, wherein the movable wall may be configured to provide a volumetric change of the second chamber that is inverse to a volumetric change of the damping fluid.

In accordance with another embodiment of the present disclosure, a roof rack system for a through-shaft damper is provided. The through-shaft damper generally includes an elongate damper body comprising a central bore having an inner surface and defining a first chamber configured to retain damping fluid, the elongate damper body having a first aperture at a proximal end and a second aperture at a distal end; a shaft slidingly disposed within the central bore and extending through the first aperture and the second aperture; a piston fixed to the shaft within the first chamber, and configured to sealingly engage the inner surface of the central bore; an insert coupled to the distal end of the elongate damper body, the insert surrounding the shaft and extending from the distal end into the first chamber; a second chamber within the bore configured to retain a gas, the second chamber partially defined by an external surface of the insert; and a flexible dividing bladder disposed between the first chamber and the second chamber, the flexible dividing bladder configured to annularly couple to the external surface of the insert at a first end and to annularly couple to the elongate damper body at a second end, wherein the flexible dividing bladder may be configured to provide a volumetric change of the second chamber that is inverse to a volumetric change of the damping fluid.

In accordance with any of the embodiments described herein, the movable wall may be a second piston slidingly associated with the insert, the second piston configured to travel axially within the bore and prevent ingress of the damping fluid to the second chamber and prevent ingress of the gas to the first chamber.

In accordance with any of the embodiments described herein, the first piston may have a plurality of apertures extending therethrough.

In accordance with any of the embodiments described herein, the distal end of the elongate damper body may further include a cap portion couplable to the outer wall and surrounding the shaft, and wherein the cylindrical insert may be coupled to the cap portion.

In accordance with any of the embodiments described herein, the through-shaft damper may further include a bracket couplable to the cap portion, the bracket configured to interface a mounting location.

In accordance with any of the embodiments described herein, the elongate damper body may have a first shaft sealing member disposed near the first aperture and configured to interface the shaft to prevent egress of the damping fluid from the first chamber.

In accordance with any of the embodiments described herein, the elongate damper body may have a second shaft sealing member disposed near the second aperture and configured to interface the shaft to prevent egress of the damping fluid from the first chamber.

In accordance with any of the embodiments described herein, the second chamber may contain pressurized nitrogen gas.

In accordance with any of the embodiments described herein, the flexible dividing bladder may be configured to prevent ingress of the damping fluid to the second chamber and prevent ingress of the gas to the first chamber.

In accordance with any of the embodiments described herein, the flexible dividing bladder may be manufactured from a material selected from the group consisting of nitrile rubber, Fluorocarbon Elastomer Material (FKM), Ethylene-Propylene (EPDM), Polyurethane (AU, EU), and natural rubber.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

Figure 1:
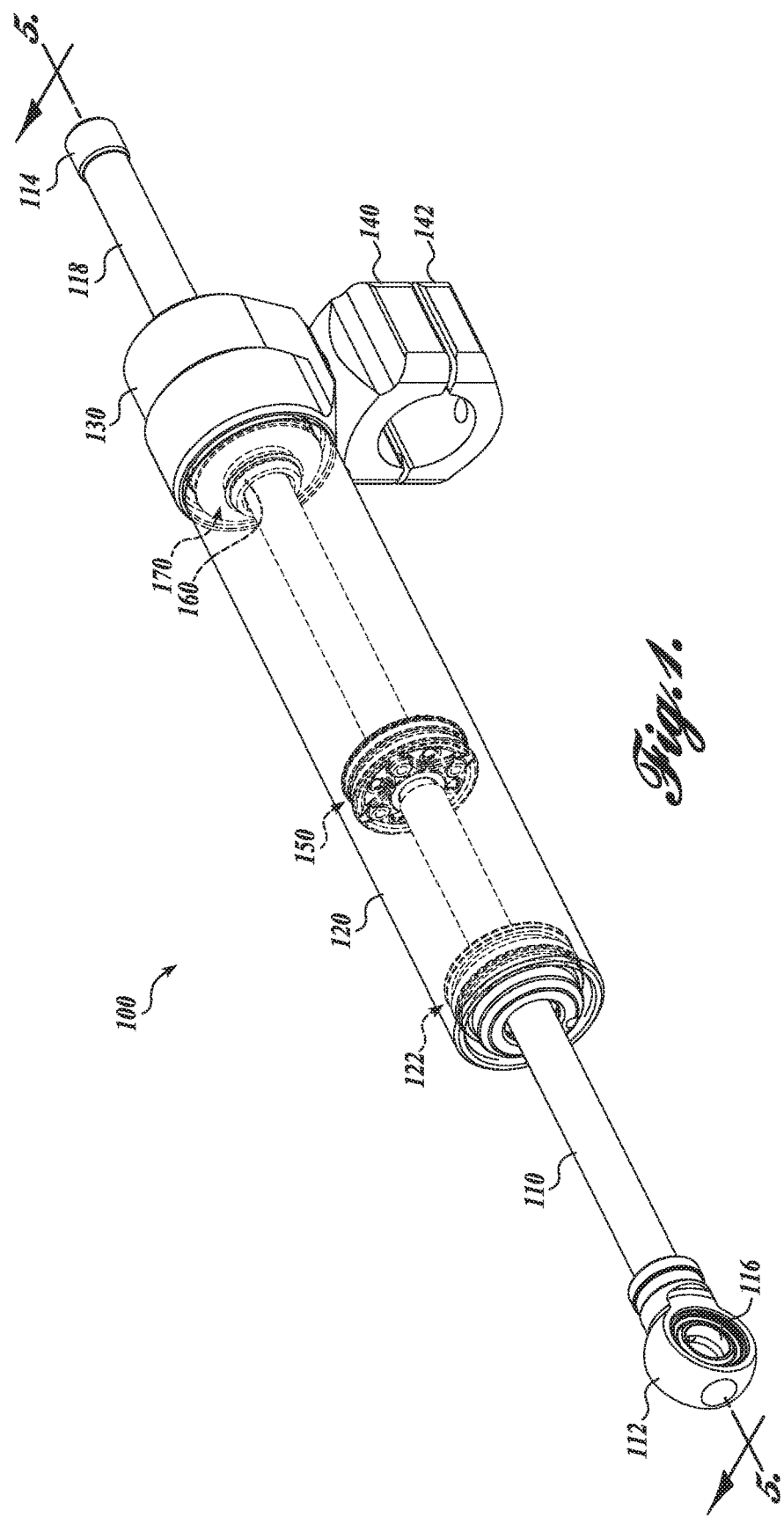
FIG. 1 is a front right top perspective view of one representative embodiment of a through-shaft damper in accordance with an aspect of the present disclosure.
Figure 2:
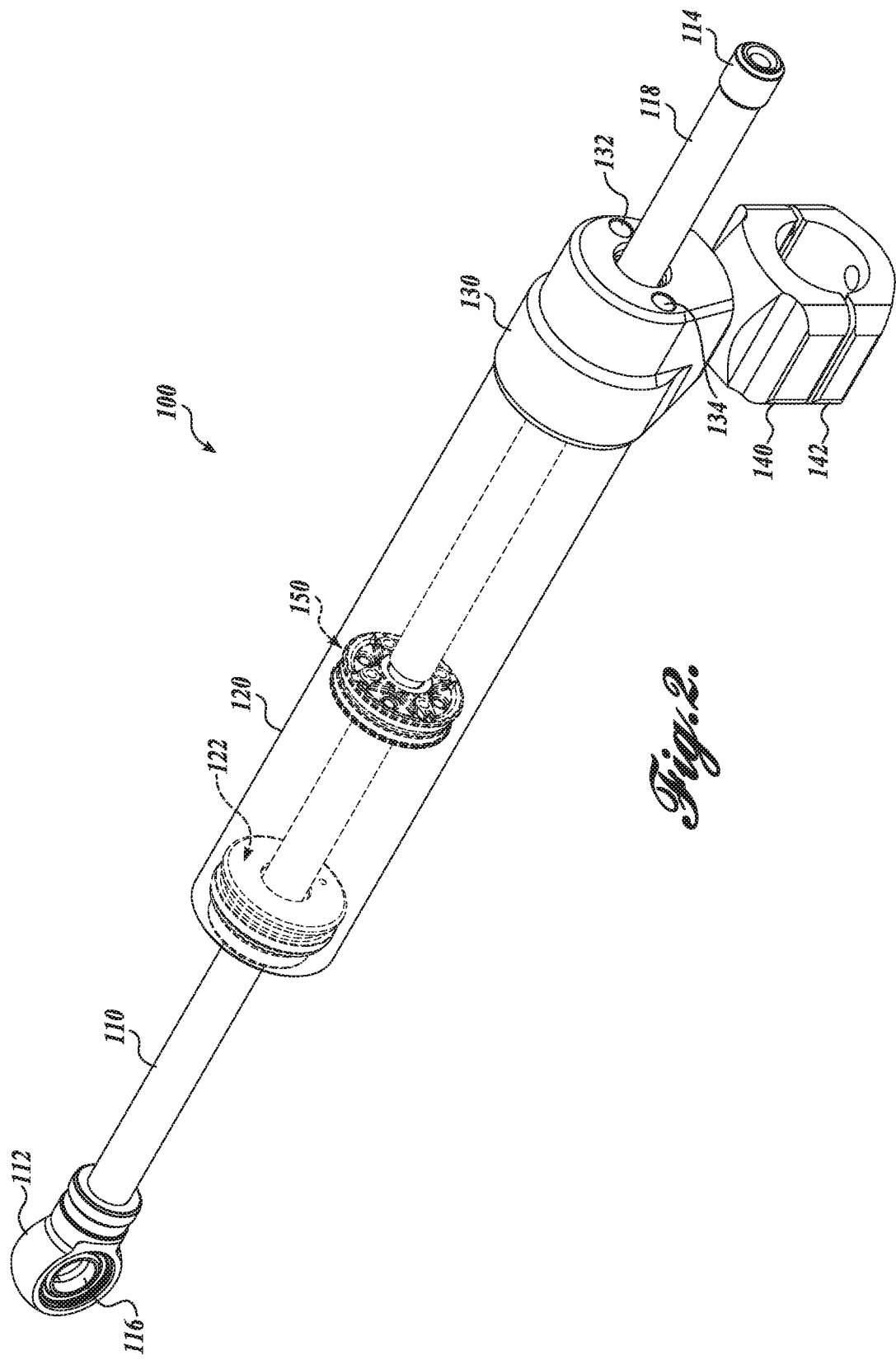
FIG. 2 is a rear right top perspective view of the through-shaft damper of FIG. 1.
Figure 3:
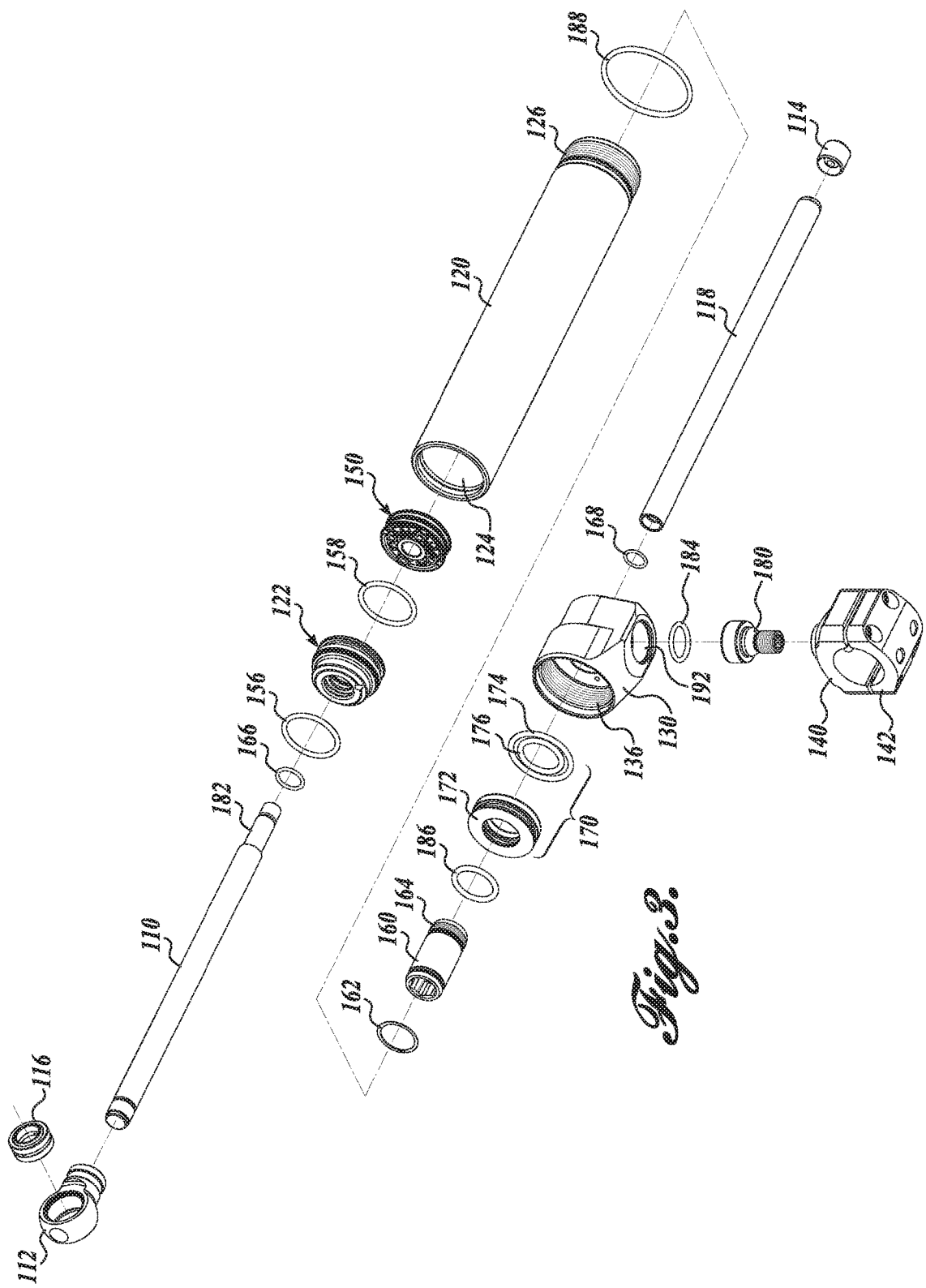
FIG. 3 is a front right bottom exploded view of the through-shaft damper of FIG. 1.

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "rear," "upward," "downward," "top," "bottom," "right hand," "left hand," "lateral," "medial," "in," "out," "extended," etc. These references, and other similar references in the present application, are only to assist in helping describe and to understand the particular embodiment and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number.

The following description provides several examples that relate to dampers. Embodiments of the present disclosure are generally directed to through-shaft dampers for general use with vehicle, and in some embodiments the steering systems of vehicles. Embodiments of the through-shaft dampers disclosed herein are suitable to attach to components of the vehicle to dampen the movement of the steering system. However, embodiments of the through-shaft dampers disclosed herein are suitable for use in any installation where a through-shaft damper is configured. Embodiments disclosed herein use symmetry, where applicable, for clarity and convenience; however, the use of symmetry (e.g., left to right, front and rear, and/or top and bottom, etc.) should not be construed as limiting the scope of the disclosure to symmetric parts, as the present disclosure also contemplates "handed" parts in locations where symmetric parts are illustrated and described.

A through-shaft damper generally includes a damper body with a central bore that includes a primary chamber for retaining hydraulic damping fluid. In a through-shaft damper of the type in the embodiments disclosed herein, the shaft carries a piston at an intermediate location. The intermediate piston location is in contrast to non-through-shaft dampers with the piston located at one end of the shaft. In embodiments of the through-shaft dampers, the piston travels through the hydraulic damping fluid within the central bore upon axial movement of the shaft. The piston generally includes small apertures extending through the piston and sized such that the apertures provide fluidic resistance as the piston travels through the hydraulic damping fluid. In this regard, the movement of the piston through the hydraulic damping fluid provides a force counter to the movement of the shaft, resulting in a damping effect of the motion of the shaft. The force provided by the hydraulic damping fluid is dependent on a range of factors, including hydraulic damping fluid viscosity, temperature, pressure, purity, composition; shaft velocity; and piston aperture size and shape, among other factors.

In certain embodiments disclosed herein, a general characteristic of the through-shaft damper is the shaft extending beyond both ends of the damper body during operation. The through-shaft characteristic provides a more balanced operation in both directions of shaft travel, at least because the shaft does not displace the hydraulic damping fluid as it enters the primary chamber of the damper body, among other factors. In some embodiments, the piston can be configured to resist movement of the shaft in a substantially balanced manner for both directions of travel. For these reasons, among other design considerations, through-shaft dampers are generally used in steering systems where a balanced feel is desired in both clockwise and counter-clockwise directions of rotation of the steering wheel of the vehicle. In other embodiments, the through-shaft damper is suitably used in other vehicle steering configurations, such as motorcycles, all-terrain vehicles, side-by-side vehicles, golf-carts, bicycles, and the like.

Hydraulic fluid dampers typically include a secondary gas chamber that is smaller in size than the primary chamber. The gas chamber provides various advantages, including allowing thermal expansion and contraction of the hydraulic damping fluid, a reduction in cavitation of the hydraulic damping fluid, and a means for adjustment of the performance and characteristics of the damper. To allow changes in the volume of the hydraulic damping fluid in the primary chamber, a movable seal or dividing bladder is positioned between the primary and gas chambers. The movable seal or dividing bladder prevents mixing of the hydraulic damping fluid and the gas, but allows relative movement to adjust the volume of the primary and gas chambers in an inverse relationship, where an increase in one of the primary or secondary chambers results in a decrease in the other of the primary or secondary chambers in reaction to volumetric change in the hydraulic damping fluid. In conventional damper designs, the movable seal or dividing bladder can be included in the damper in a variety of configurations, including a floating piston in the primary chamber, within a remote reservoir, or in a twin-tube design, among others. Sealing the gas within the gas chamber from the atmosphere is difficult to accomplish and can lead to issues for manufacturers. Embodiments of the present disclosure are generally directed to improving the reliability of the movable seal or dividing bladder between the primary and gas chambers by limiting the potential paths for the gas to reach the atmosphere. In this regard, other improvements include reducing manufacturing and part costs, lowering the weight of the damper, and providing a smaller body for increased mounting options, among other improvements and benefits.

Referring initially to FIGS. 1-6, a first exemplary embodiment of a through-shaft damper 100 suitable for use with the steering system of a vehicle is depicted. The through-shaft damper 100 is shown with mounting features for installation of the through-shaft damper 100 to mounting points between which damped motion is desired. In one example, a damper is suitably integrated into the steering system of a vehicle to provide a damping effect to the movements of the steering system. As discussed above, damping of a steering system of a vehicle may be desired when unintended movement or oscillation can disrupt the control of the vehicle; or when damping will improve the steering feel, ability to control the path of the vehicle, or reduce driver fatigue. Dampers of the type described in the embodiments of the present disclosure are suitable for a variety of configurations, and may be integrated to other systems beyond the steering system of a vehicle without departing from the scope of the present disclosure.

Using the embodiments of the present disclosure, vehicles with underdamped steering systems can be modified to change the steering characteristics and the vehicle control and stability. In some configurations, it may be desirable to limit the effect an uneven road surface or object impacting the tire imparts on the steering system, such as when traveling on an unimproved surface with rough terrain, or on a heavily rutted road surface. In these situations, driver fatigue and diminished vehicle control can detract from the experience driving the vehicle. Accordingly, the embodiments herein can be used with the steering system of a vehicle where damping provides an improvement to one or more steering factors.

Although the through-shaft damper 100 and other exemplary embodiments are described as being used with the steering system of a vehicle, it should be appreciated that the embodiments may be used in any suitable system where damped motion between relative movement of components is desired. Additionally, the embodiments are shown and described herein with one exemplary mounting system for the through-shaft damper 100; however, any suitable mounting configuration can be combined with the embodiments for any suitable use.

Still referring to FIGS. 1-6, the through-shaft damper 100 will now be described in detail. In the illustrated embodiment, the through-shaft damper 100 generally includes a primary shaft 110 extending through a proximal end of a damper body 120, and a secondary shaft 118 extending through a distal end of the damper body 120. In the embodiments herein, the shaft is illustrated as two components, the primary shaft 110 and the secondary shaft 118. However, in other embodiments, the shaft is suitably a single component, or a combination of more than two components. In some embodiments, a two component shaft allows for easier installation of a piston assembly 150, which will be discussed in detail below. The primary shaft 110 and the secondary shaft 118 are coupled using a shaft coupling 182, illustrated as a threaded socket (see FIG. 5). In other embodiments, the shaft components are coupled using any suitable coupling design. The secondary shaft 118 has a shaft end cap 114 to protect the exposed end of the secondary shaft 118.

The primary shaft 110 and secondary shaft 118 carry the piston assembly 150 fixed near the shaft coupling 182. The piston assembly 150 is configured to slidingly travel within a primary chamber 124 of the damper body 120 during operation of the through-shaft damper 100. In some embodiments, the primary chamber 124 contains a hydraulic damping fluid (not shown) to provide fluidic resistance to the movement of the piston assembly 150, thereby damping the motion of the primary and secondary shafts 110 and 118 in relation to the damper body 120. In some embodiments, the hydraulic damping fluid is oil with a viscosity chosen to provide the desired fluidic resistance during travel of the piston assembly 150. In other embodiments, the hydraulic damping fluid is any suitable fluid.

The piston assembly 150 will now be briefly described in detail. The piston assembly 150 is generally mounted on the surface of the primary shaft 110 such that the interface of the piston assembly 150 and the primary shaft 110 forms a seal to prevent flow of the hydraulic damping fluid at the inner interface of the piston assembly 150. In other embodiments, the piston assembly 150 is suitably mounted to the surface of the secondary shaft 118. In the configuration of the disclosed embodiments, the piston assembly 150 is fixed in relation to the primary and secondary shafts 110 and 118 such that it does not translate along the primary and secondary shafts 110 and 118 during operation of the through-shaft damper 100.

Figure 4:
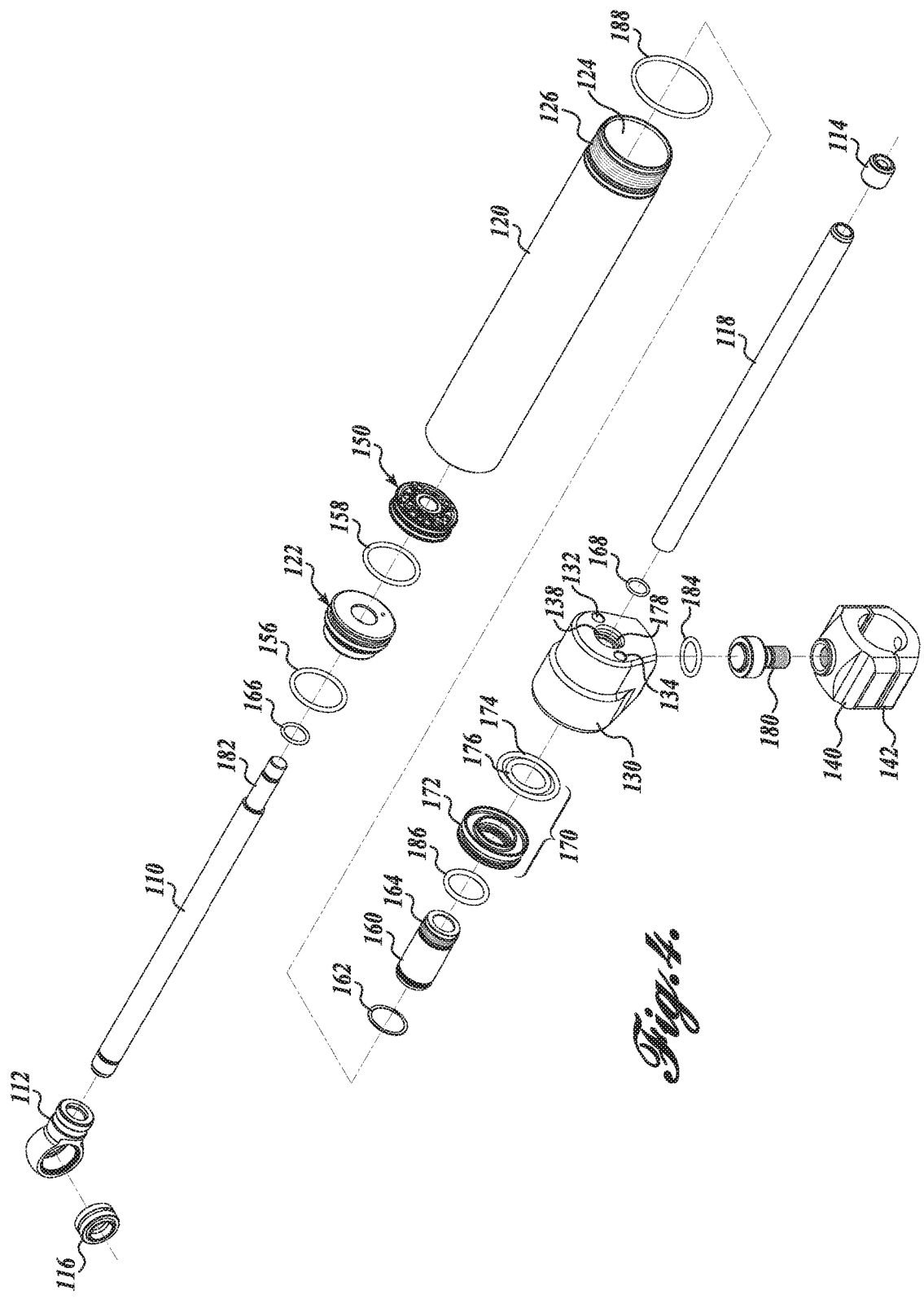
FIG. 4 is a rear right top exploded view of the through-shaft damper of FIG. 1.
Figure 5:
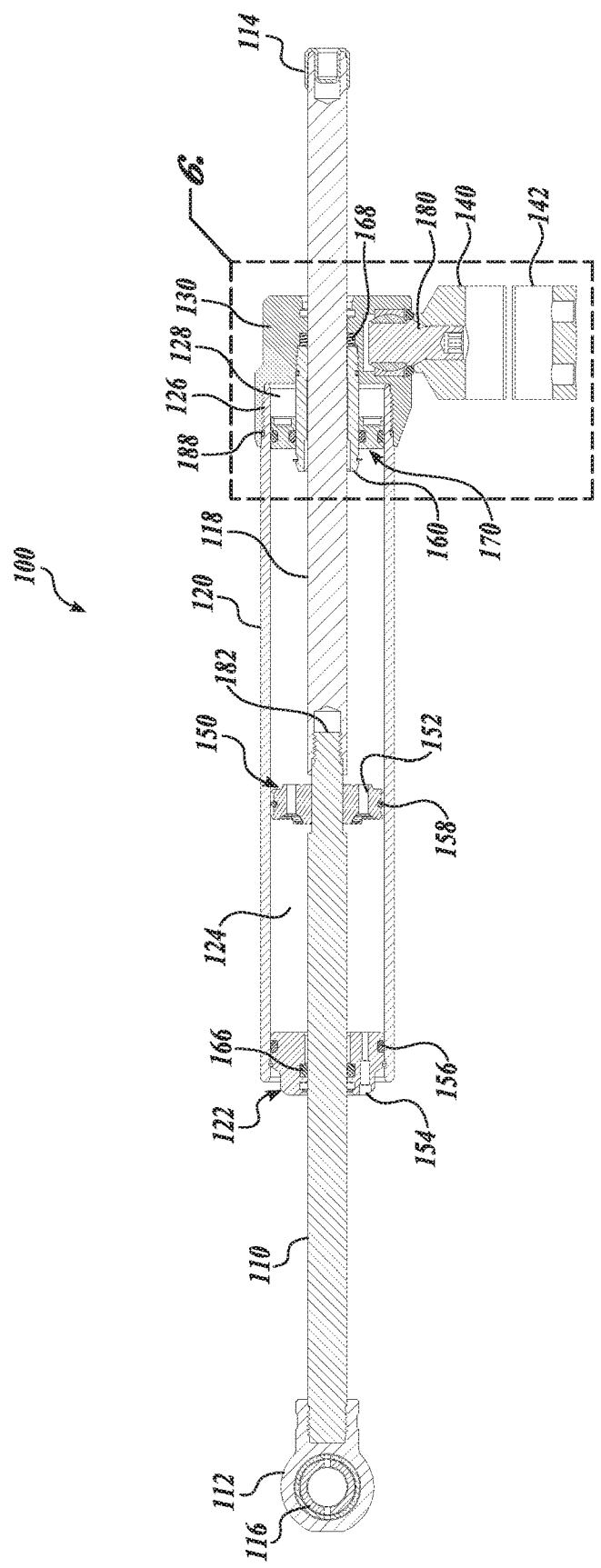
FIG. 5 is a right side cutaway view of the through-shaft damper of FIG. 1, showing the cut along arrows 5-5 as indicated in FIG. 1.
Figure 6:
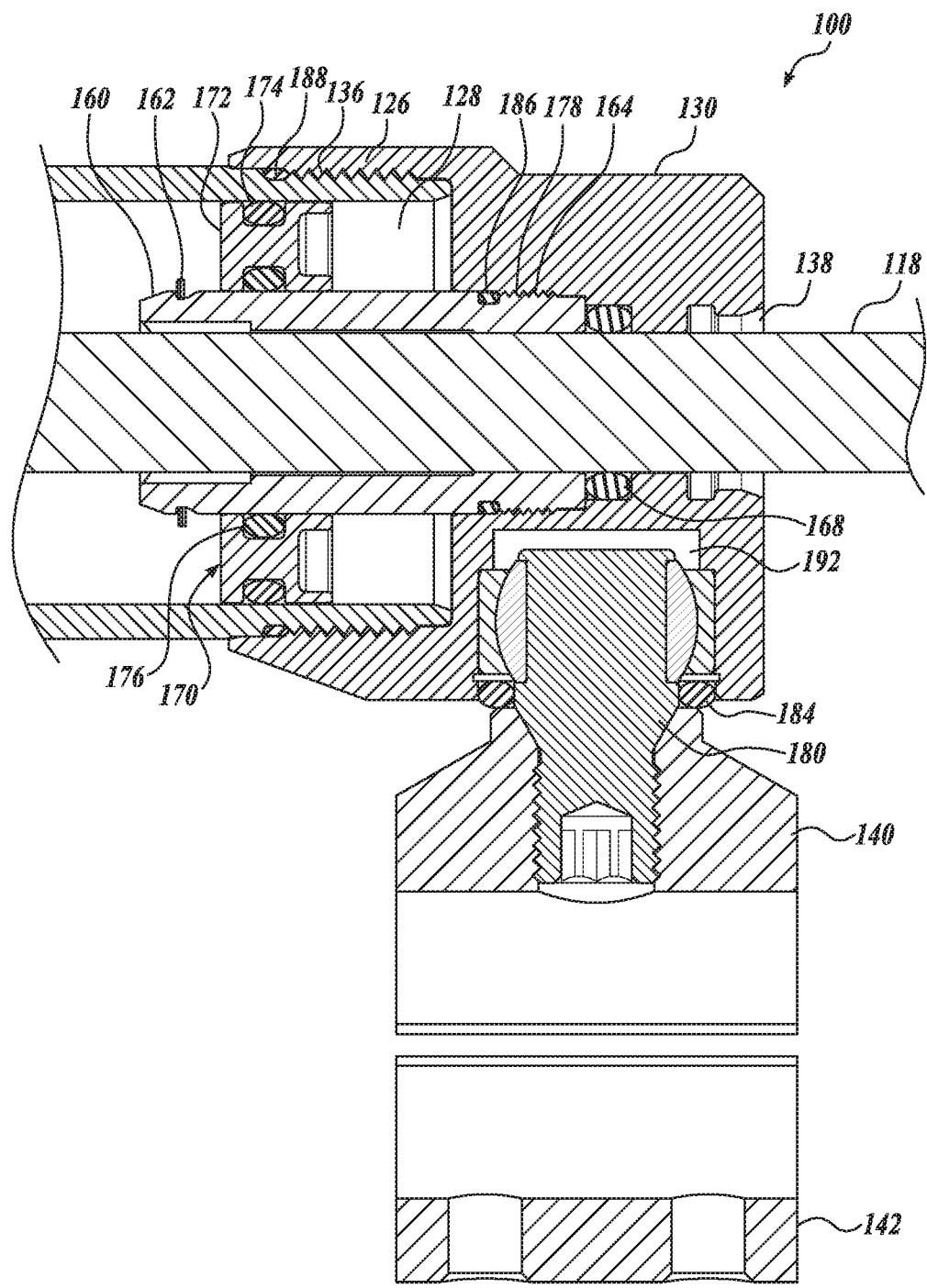
FIG. 6 is a right side cutaway detail view of the through-shaft damper of FIG. 1, showing the area indicated in FIG. 5.

To complement the sealing at the inner interface of the piston assembly 150, the outer interface generally has a seal to interact with the inner wall of the damper body 120, such as piston o-ring 158 (see FIGS. 3-5), that likewise prevents flow of the hydraulic damping fluid at the outer interface of the piston assembly 150. In other embodiments, any suitable sealing configuration is used in conjunction with the piston assembly 150. As shown in FIG. 5, flow of the hydraulic fluid through the piston assembly 150 is controlled by a plurality of apertures 152, which are sized and configured to provide the desired damping effect during use of the through-shaft damper 100. Although one representative configuration of the piston assembly 150 is illustrated in the FIGURES, the embodiments disclosed herein are suitable for use with any piston assembly and aperture configuration.

The sealing configuration of the primary chamber 124 will now be described in detail. The primary chamber 124 is sealed at the proximal and distal ends of the damper body 120 to prevent the egress of hydraulic damping fluid and the ingress of contaminants. At the proximal end of the damper body 120, a chamber sealing assembly 122 is configured to closely interface of the surface of the primary shaft 110 and the inner wall of the damper body 120. In the embodiments disclosed herein, the chamber sealing assembly 122 is pressed into the primary chamber 124 such that the chamber sealing assembly 122 is fixed by friction with the inner wall of the primary chamber 124. In other embodiments, the chamber sealing assembly 122 is suitably coupled to the damper body 120 using any coupling.

The chamber sealing assembly 122 allows sliding movement of the primary shaft 110 relative to the chamber sealing assembly 122 without allowing hydraulic damping fluid to escape the primary chamber 124 or contaminants to enter the primary chamber 124. In the illustrated embodiments, the chamber sealing assembly 122 includes a proximal inner o-ring 166 to prevent egress of the hydraulic damping fluid at the interface of the primary shaft 110, and a proximal outer o-ring 156 to prevent egress of the hydraulic damping fluid at the interface of the inner wall of the damper body 120. Similar to the outer sealing configuration of the piston assembly 150, in other embodiments, any suitable sealing configuration can be used with the chamber sealing assembly 122. In further embodiments, the damper body 120 is sized and shaped to eliminate the requirement of a sealing assembly 122, and only requires a single sealing interface at the outer surface of the primary shaft 110.

The mounting configuration of the end of the primary shaft 110 will now be briefly described in detail. The external end of the primary shaft 110 includes a mounting joint head 112, with an articulating insert 116 for mounting one end of the through-shaft damper 100 to a component of the vehicle. The illustrated embodiments include a mechanical articulating joint (e.g., a heim joint, spherical rod end joint, etc.) for articulation of the joint at the mounting point. In other embodiments, any suitable mounting joint can be used to mount the end of the primary shaft 110 to the vehicle component.

Returning now to the sealing configuration of the primary chamber 124, an end cap 130 is configured to mechanically couple to the distal end of the damper body 120. The end cap 130 includes an aperture 138 to allow the secondary shaft 118 to slidingly extend beyond the end cap 130 during operation of the through-shaft damper 100. In the illustrated embodiment, the end cap 130 includes a distal inner o-ring 168 to prevent egress of the hydraulic damping fluid at the interface of the end cap 130 and the secondary shaft 118. In other embodiments, any suitable sealing configuration can be used with the end cap 130.

The end cap 130 will now be described in detail. As shown most clearly in FIG. 6, the end cap 130 mechanically couples to the distal end of the damper body 120 during assembly of the through-shaft damper 100. An end cap outer o-ring 188 is provided to seal the mechanical threaded coupling. The illustrated coupling is a mechanical threaded coupling with an interface of damper body threads 126 and end cap body threads 136; however, in other embodiments, the coupling is suitably any configuration, including press-fit, turn-to-lock, welded, adhesive, and the like. In some embodiments, the end cap 130 provides a mounting configuration for attachment of a clamshell mounting bracket 140 including a corresponding lower clamshell 142. In this regard, the mounting bracket 140 is configured to attach to a tube-shaped component on the vehicle. In other embodiments, the mounting bracket is any suitable configuration to mount to the secondary location on the vehicle.

The clamshell mounting bracket 140 is movably coupled to a socket 192 of the end cap 130 through a threaded coupling member 180. The threaded coupling member 180 is illustrated as a spherical coupling member that allows articulation and twisting of the clamshell mounting bracket 140 with respect to the end cap 130. To maintain the spherical joint free of contamination (e.g., dirt, sand, water, etc.) and retain a lubricant within the socket 192 for smooth operation, a joint o-ring 184 provides a seal from the environment exterior to the joint. During extension and retraction of the mounting joint head 112 with respect to the clamshell mounting bracket 140, the angle of the through-shaft damper 100 may adjust, requiring articulation in the mounting points. In other embodiments, the clamshell mounting bracket 140 can be coupled to the damper body 120 using any suitable mounting joint.

The interaction of the primary chamber 124 with a secondary chamber 128 will now be described in detail. In through-shaft dampers of the type of the present disclosure, a dual chamber configuration is intended to improve the damping performance. The secondary chamber 128 is filled with a pressurized gas (e.g., nitrogen gas). Conventional dampers without a dual chamber configuration encounter issues when the hydraulic damping fluid expands or contracts, and can experience cavitation or foaming of the hydraulic damping fluid during use, leading to deterioration of the damping performance. As described above, various configurations of separation of the primary and secondary chambers exist, such as floating pistons, remote reservoirs, dividing bladders, twin-tube designs, etc. A particular challenge with a through-shaft damper that locates the secondary chamber in the damper body, is the shaft necessarily extends through the secondary chamber. The presence of the shaft in the secondary chamber can be problematic with conventional through-shaft dampers, because it requires a sealing configuration between the gas in the secondary chamber with the atmosphere along the outer surface of the shaft, and also requires a sealing configuration with the shaft that exhibits relatively active movement, both leading to premature seal failures.

In the embodiments of the present disclosure, the secondary chamber 128 does not require a moving seal between the gas and the atmosphere outside of the through-shaft damper 100, which will be described in further detail below. Referring now to FIG. 4, the end cap includes at least one secondary chamber filling port 132, which is sealed with a stationary filling port plug 134. Upon filling the secondary chamber 128 with the pressurized gas, the filling port plug 134 is inserted to prevent egress of the gas. In this regard, maintaining the pressure of the gas within the secondary chamber 128 is more reliable than with a moving seal configuration of a conventional through-shaft damper. One alternative conventional solution requires an external reservoir where the secondary chamber resides. External reservoir configurations add cost and complexity to the through-shaft damper, and introduce packaging constraints. The embodiments of the present disclosure include a secondary chamber in the damper body with a floating separation piston assembly interacting with non-moving components of the through-shaft damper 100.

To separate the primary chamber 124 from the secondary chamber 128, a floating separation piston assembly 170, including a floating separation piston 172, is provided. In the illustrated embodiments, the primary chamber 124 is separated from the secondary chamber 128 with the floating separation piston 172; however, in other embodiments, the primary chamber 124 is separated from the secondary chamber 128 using any suitable movable wall that allows the volume in the chambers to adjust with an inverse relationship. In one example, the moveable wall is a flexible dividing bladder 270 (see FIGS. 7-9) which will be explained below as an additional embodiment.

The floating separation piston assembly 170 slidingly moves within the damper body 120 to allow expansion and contraction of the hydraulic damping fluid in the primary chamber 124. Expansion and contraction of the hydraulic damping fluid is generally the result of thermal changes as heat is dissipated within the system. The gas in the secondary chamber 128 is pressurized to maintain the hydraulic damping fluid under pressure in the primary chamber 124. In this regard, the pressure in the primary chamber 124 counteracts cavitation and foaming of the hydraulic damping fluid, which is detrimental to the damping performance of the through-shaft damper 100.

The sealing configuration of the floating separation piston assembly 170 will now be described in detail. The floating separation piston 172 seals against the inner wall of the damper body 120 using an outer floating separation piston o-ring 174. In a similar manner to the piston o-ring 158 described above, the outer floating separation piston o-ring 174 provides a seal at the inner surface of the damper body 120. The configuration of the inner seal of the floating separation piston 172 avoids an interface with the secondary shaft 118 by use of a separator insert 160 extending through the secondary chamber 128 and into the primary chamber 124.

In the illustrated embodiment, the separator insert 160 is substantially cylindrical in shape. In other embodiments, the separator insert 160 is shaped to provide a suitable sealing surface for the floating separation piston 172. In some embodiments, the separator insert 160 is mechanically coupled to the end cap 130 using insert threads 164 interacting with corresponding end cap insert threads 178. A separator insert o-ring 186 is provided to seal the threaded coupling. In other embodiments, the coupling is suitably any configuration, including press-fit, turn-to-lock, welding, adhesive, and the like. The separator insert 160 is configured to interact with an inner floating separation piston o-ring 176 of the floating separation piston 172. On the opposite end of the separator insert 160, a retaining ring 162 is provided to prevent the floating separation piston 172 from traveling past the end of the separator insert 160.

The outer and inner floating separation piston o-rings 174 and 176 seal against the inner wall of the damper body 120 and the outer wall of the separator insert 160, respectively, to prevent mixing of the contents of the primary and secondary chambers 124 and 128. In some embodiments, the sealing configuration of the floating separation piston 172 is a bi-directional lip seal or a quad ring seal. In other embodiments, any suitable sealing configuration is used in conjunction with the floating separation piston 172. Egress of the hydraulic damping fluid in the primary chamber or gas in the secondary chamber detrimentally affects damping performance.

By inclusion of the separator insert 160, a path of gas in the secondary chamber 128 to the secondary shaft 118 is not present in an actively moving component. Put another way, a moving seal between the gas in the secondary chamber 128 and the atmosphere is avoided by the embodiments of the present disclosure. The gas in the secondary chamber 128 is sealed from the atmosphere using only stationary seals (the separator insert o-ring 186 and the end cap outer o-ring 188) and the stationary filling port plug 134. As a result of the sealing of the gas in the secondary chamber 128 from the atmosphere, increased reliability is achieved.

In another aspect of the present disclosure, the dynamic sealing surfaces at the outer and inner floating separation piston o-rings 174 and 176 experience less motion (i.e., travel less distance during use) than the seals interacting with the outer surface of the primary and secondary shafts 110 and 118. The motion of the primary and secondary shafts 110 and 118 is generally on the order of up to three-thousand times greater than the motion of the floating separation piston 172 with respect to the inner surface of the damper body 120 and the outer surface of the separator insert 160. In one embodiment, during normal use of the through-shaft damper 100, the floating separation piston 172 has a total displacement traveled (irrespective of direction) of about one inch per hour. Correspondingly, the primary and secondary shafts 110 and 118 can have a total displacement traveled of about three-thousand inches per hour. A reduction in relative movement of the seals along the sealing surfaces generally provides a longer life and increased reliability of the seal.

A second exemplary embodiment of a through-shaft damper 200 will now be described with reference to FIGS. 7-9. The through-shaft damper 200 is substantially similar in materials and operation as the through-shaft damper 100 outlined above, except with respect to the separation component dividing the primary chamber and the secondary chamber. For clarity in the ensuing descriptions, numeral references of like elements of the through-shaft damper 100 are similar, but are in the 200 series for the illustrated embodiment of FIGS. 7-9.

Figure 7:
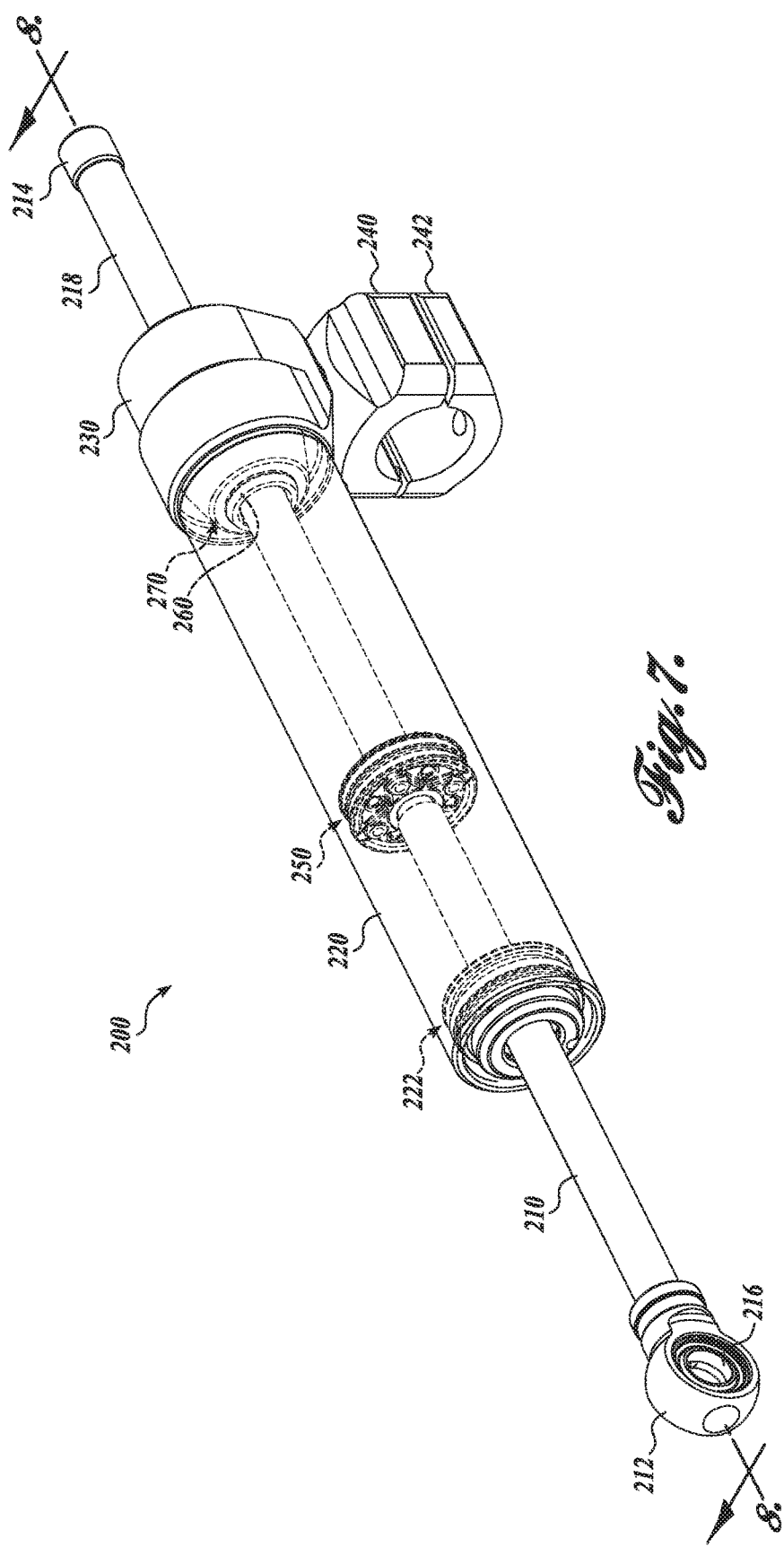
FIG. 7 is a front right top perspective view of another representative embodiment of a through-shaft damper in accordance with an aspect of the present disclosure.
Figure 8:
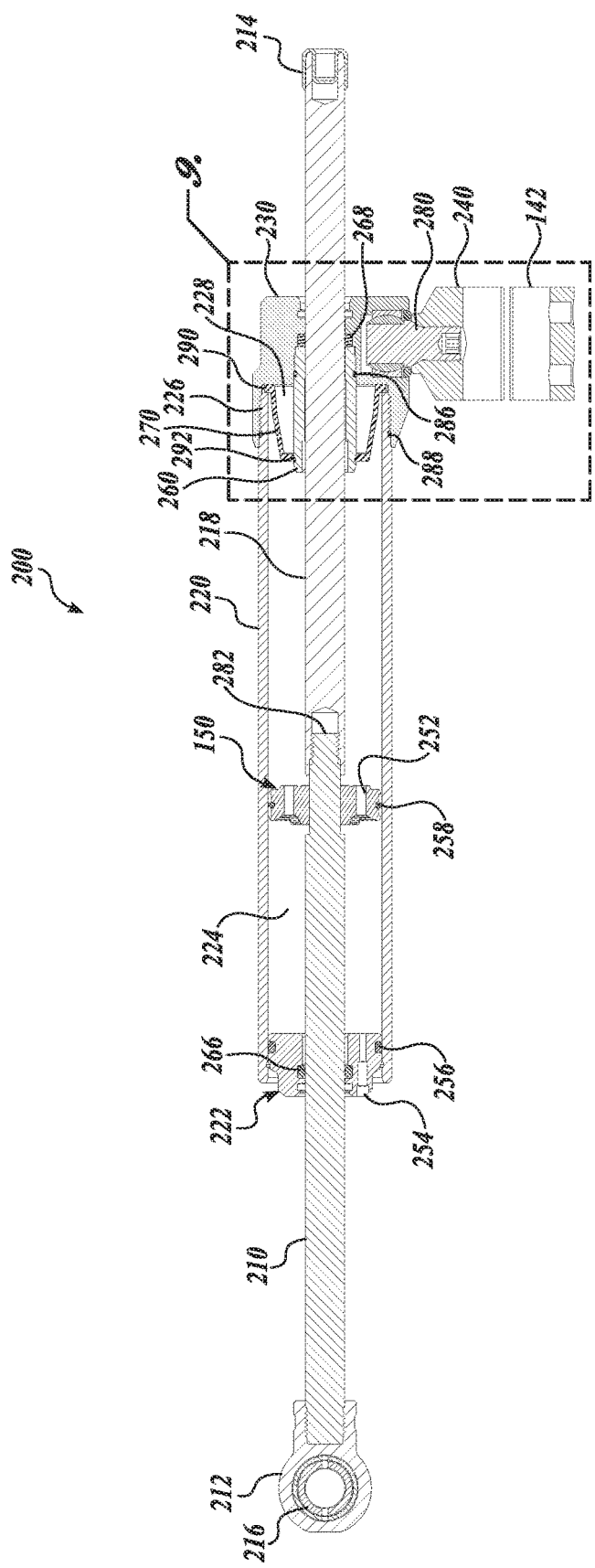
FIG. 8 is a right side cutaway view of the through-shaft damper of FIG. 7, showing the cut along arrows 8-8 as indicated in FIG. 7.
Figure 9:
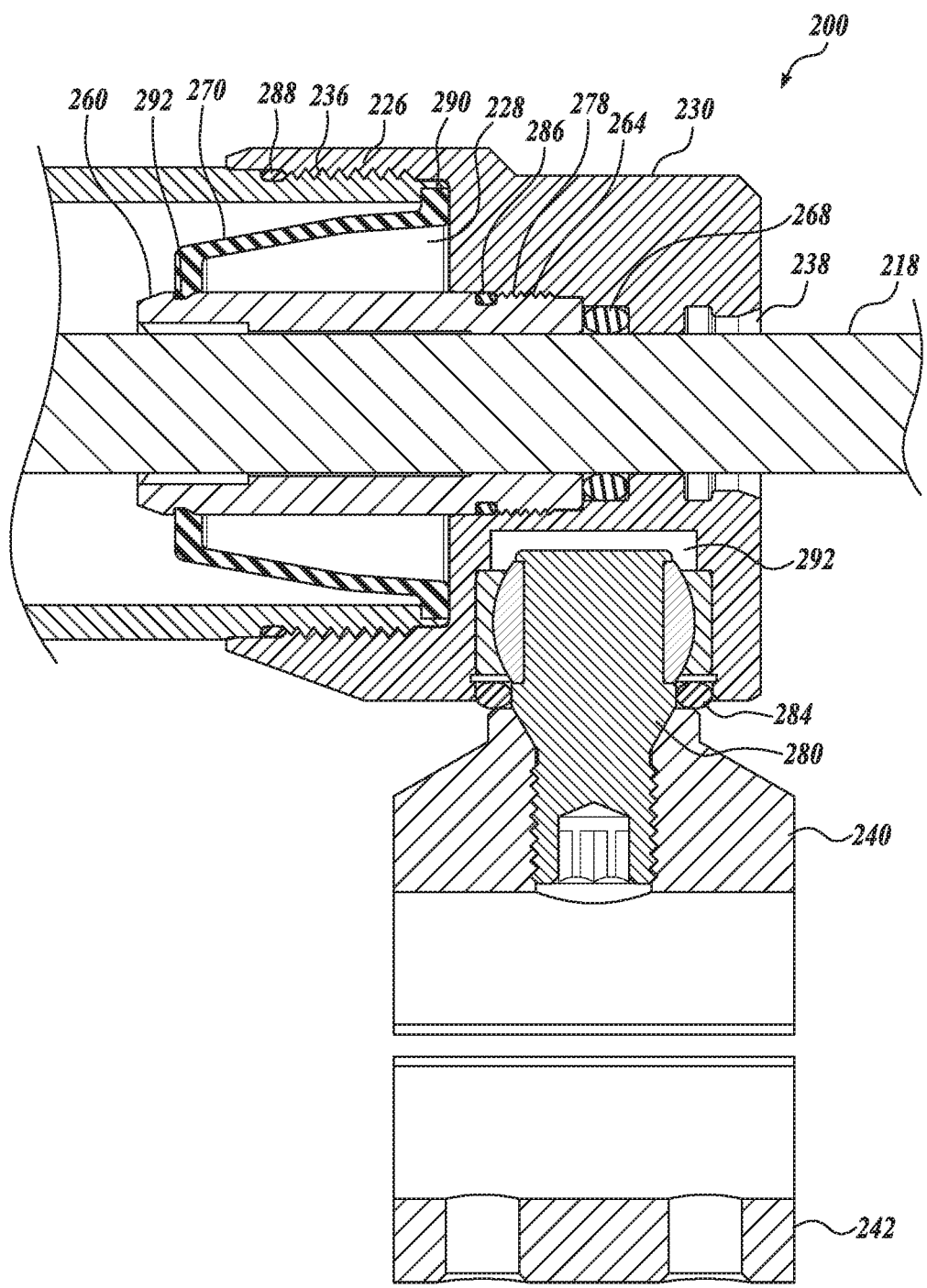
FIG. 9 is a right side cutaway detail view of the through-shaft damper of FIG. 7, showing the area indicated in FIG. 8.

As illustrated in FIGS. 7-9, the through-shaft damper 200 includes a primary chamber 224 for containing a hydraulic damping fluid, and a secondary chamber 228 for containing a gas. The primary chamber 224 and the secondary chamber 228 are separated by a flexible dividing bladder 270 as opposed to the floating separation piston assembly 170 of the through-shaft damper 100. In this regard, the flexible dividing bladder 270 has a proximal attachment segment 292 and a distal attachment segment 290. The proximal attachment segment 292 annularly attaches the flexible dividing bladder 270 to a separator insert 260, and the distal attachment segment 292 annularly attaches the flexible dividing bladder 270 to the inner wall of a damper body 220. The function of the flexible dividing bladder 270 is similar to the floating separation piston assembly 170; however, the flexible dividing bladder 270 has stationary seals at the proximal attachment segment 292 and the distal attachment segment 290. In other embodiments, the distal attachment segment 292 is attached to a different component of the through-shaft damper 200, for example, an end cap 230.

The flexible dividing bladder 270 is configured to deform in reaction to volumetric changes in the hydraulic damping fluid in the primary chamber 224. As with the chambers of the through-shaft damper 100, the primary chamber 224 and the secondary chamber 228 exhibit a volumetrically inverse relationship. In some embodiments, the flexible dividing bladder 270 is manufactured from rubber. In other embodiments, the flexible dividing bladder 270 is manufactured from a nitrile rubber (e.g., Buna-N, Perbunan, acrylonitrile butadiene rubber, NBR, etc.). In further embodiments, the flexible dividing bladder 270 is manufactured from Fluorocarbon (FKM), Ethylene-Propylene (EPDM), Polyurethane (AU, EU), or any other synthetic or natural rubber.

As a result of the stationary seals at the proximal attachment segment 292 and the distal attachment segment 290, the outer surface of the separator insert 260 is not a critical sealing surface necessitating dimensional tolerances of the type required for functional movement of a seal. As a result, in some embodiments, the separator insert 260 is suitably welded to an end cap 230. The welding process can introduce warping to the separator insert 260 that could otherwise cause loss of function of the through-shaft damper. In the illustrated embodiment, the separator insert 260 is substantially cylindrical in shape. In other embodiments, the separator insert 260 is shaped to provide a suitable attachment for the proximal attachment segment 292.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A through-shaft damper, comprising:
    an elongate damper body comprising a central bore having an inner surface and defining a first chamber configured to retain damping fluid, the elongate damper body having a first aperture at a proximal end and a second aperture at a distal end;
    a shaft slidingly disposed within the central bore and extending through the first aperture and the second aperture, the shaft defining a shaft axis;
    a damping piston fixed to the shaft within the first chamber and configured to sealingly engage the inner surface of the central bore;
    a second chamber within the central bore configured to retain a gas; and
    a floating piston positioned between the first chamber and the second chamber within the central bore, the floating piston configured to travel axially along the shaft axis within the central bore independently from the shaft, provide fluid separation between the first chamber and the second chamber, and to provide a volumetric change of the second chamber that is inverse to a volumetric change of the damping fluid.

2. The through-shaft damper of claim 1, wherein the floating piston is configured to prevent ingress of the damping fluid to the second chamber and prevent ingress of the gas to the first chamber.

3. The through-shaft damper of claim 1, wherein the damping piston has a plurality of apertures extending therethrough.

4. The through-shaft damper of claim 1, wherein the distal end of the elongate damper body comprises a cap portion couplable to an outer wall of the damper body and surrounding the shaft.

5. The through-shaft damper of claim 4, further comprising a bracket couplable to the cap portion, the bracket configured to interface a mounting location.

6. The through-shaft damper of claim 1, wherein the elongate damper body has a first shaft sealing member disposed near the first aperture and configured to interface the shaft to prevent egress of the damping fluid from the first chamber, and a second shaft sealing member disposed near the second aperture and configured to interface the shaft to prevent egress of the gas from the second chamber.

7. The through-shaft damper of claim 1, wherein the second chamber contains pressurized nitrogen gas.

8. A through-shaft damper, comprising:
    an elongate damper body comprising a central bore defining a first chamber configured to retain damping fluid, the elongate damper body having a first aperture at a proximal end and a second aperture at a distal end;
    a shaft slidingly disposed within the central bore and extending through the first aperture and second aperture;
    an insert coupled to the distal end of the elongate damper body, the insert surrounding the shaft and extending from the distal end into the first chamber;
    a second chamber positioned adjacent the distal end within the bore and configured to retain a gas, the second chamber partially defined by an external surface of the insert; and
    a movable wall configured to move independently from the shaft and associated with the insert, the movable wall providing fluid separation between the first chamber and the second chamber, wherein the movable wall is configured to provide a volumetric change of the second chamber that is inverse to a volumetric change of the damping fluid.

9. The through-shaft damper of claim 8, wherein the shaft defines a shaft axis, and wherein the movable wall is a piston slidingly associated with the insert, the piston configured to travel axially in the direction of the shaft axis within the bore and prevent ingress of the damping fluid to the second chamber and prevent ingress of the gas to the first chamber.

10. The through-shaft damper of claim 8, wherein the distal end of the elongate damper body comprises a cap portion couplable to an outer wall of the damper body and surrounding the shaft.

11. The through-shaft damper of claim 10, further comprising a bracket couplable to the cap portion, the bracket configured to interface a mounting location.

12. The through-shaft damper of claim 8, wherein the elongate damper body has a shaft sealing member disposed near the aperture and configured to interface the shaft to prevent egress of the damping fluid from the first chamber.

13. The through-shaft damper of claim 8, wherein the second chamber contains pressurized nitrogen gas.

14. A through-shaft damper, comprising:
- an elongate damper body comprising a central bore defining a first chamber configured to retain damping fluid, the elongate damper body having an aperture at a distal end;
- a shaft slidingly disposed within the central bore and extending through the aperture;
- an insert coupled to the distal end of the elongate damper body, the insert surrounding the shaft and extending from the distal end into the first chamber;
- a second chamber positioned adjacent the distal end within the bore and configured to retain a gas, the second chamber partially defined by an external surface of the insert; and
- a flexible dividing bladder disposed between the first chamber and the second chamber, the flexible dividing bladder configured to couple to the external surface of the insert at a first end and to couple to the elongate damper body at a second end, wherein the flexible dividing bladder is configured to provide a volumetric change of the second chamber that is inverse to a volumetric change of the damping fluid.

15. The through-shaft damper of claim 14, wherein the flexible dividing bladder is configured to prevent ingress of the damping fluid to the second chamber and prevent ingress of the gas to the first chamber.

16. The through-shaft damper of claim 14, wherein the distal end of the elongate damper body is a cap portion couplable to an outer wall of the damper body and surrounding the shaft and wherein the insert is coupled to the cap portion, the cap portion further comprising a bracket configured to interface a mounting location.

17. The through-shaft damper of claim 14, wherein the elongate damper body has a shaft sealing member disposed near the aperture and configured to interface the shaft to prevent egress of the damping fluid from the first chamber.

18. The through-shaft damper of claim 14, wherein the flexible dividing bladder is manufactured from a material selected from the group consisting of nitrile rubber, Fluorocarbon Elastomer Material (FKM), Ethylene-Propylene (EPDM), Polyurethane (AU, EU), and natural rubber.

* * * * *